United States Patent [19]

Cossetti

[11] Patent Number: 4,733,946

[45] Date of Patent: Mar. 29, 1988

[54] BARS FOR REFLECTORS

[75] Inventor: Giuliano Cossetti, Tolmezzo, Italy

[73] Assignee: Seima Italiano SpA, Tolmezzo, Italy

[21] Appl. No.: 21,577

[22] Filed: Mar. 2, 1987

Related U.S. Application Data

[63] Continuation of Ser. No. 686,414, Dec. 26, 1984, abandoned.

[30] Foreign Application Priority Data

Dec. 27, 1983 [IT] Italy ............................. 83524 A/83

[51] Int. Cl.⁴ .................... G02B 6/00; G02B 5/126;
G02B 00/00; B29D 11/00
[52] U.S. Cl. ................................... 350/321; 264/1.9;
264/2.5; 350/97; 350/104; 350/320; 425/808
[58] Field of Search .............. 350/100, 102, 103, 104,
350/105, 106, 107, 108, 109, 97, 320, 616, 101,
321; 425/469, 588, 808; 264/1.9, 2.5, 1.1;
249/117

[56] References Cited

U.S. PATENT DOCUMENTS

| 3,258,840 | 7/1966 | Hedgewick et al. | 350/103 |
| 3,649,153 | 3/1972 | Brudy | 350/103 |
| 3,710,095 | 1/1973 | Donohue et al. | 350/320 |
| 3,851,947 | 12/1974 | Montgomery | 350/100 |

FOREIGN PATENT DOCUMENTS 810700 1/1937 France ............................. 350/97

Primary Examiner—John K. Corbin
Assistant Examiner—V. Lemmo
Attorney, Agent, or Firm—Wegner & Bretschneider

[57] ABSTRACT

This invention concerns bars (14) for reflectors, the bars (14) being suitable for the electroforming of blocks faceted so as to obtain such reflectors (10), and being able to have a quadrangular or hexagonal section, such bars (14) comprising at least one lateral face tapered in relation to their lengthwise axis. The invention also concerns a reflector (10) obtained at least partially by using a plurality of bars (14) of which at least part are constituted as above.

7 Claims, 11 Drawing Figures

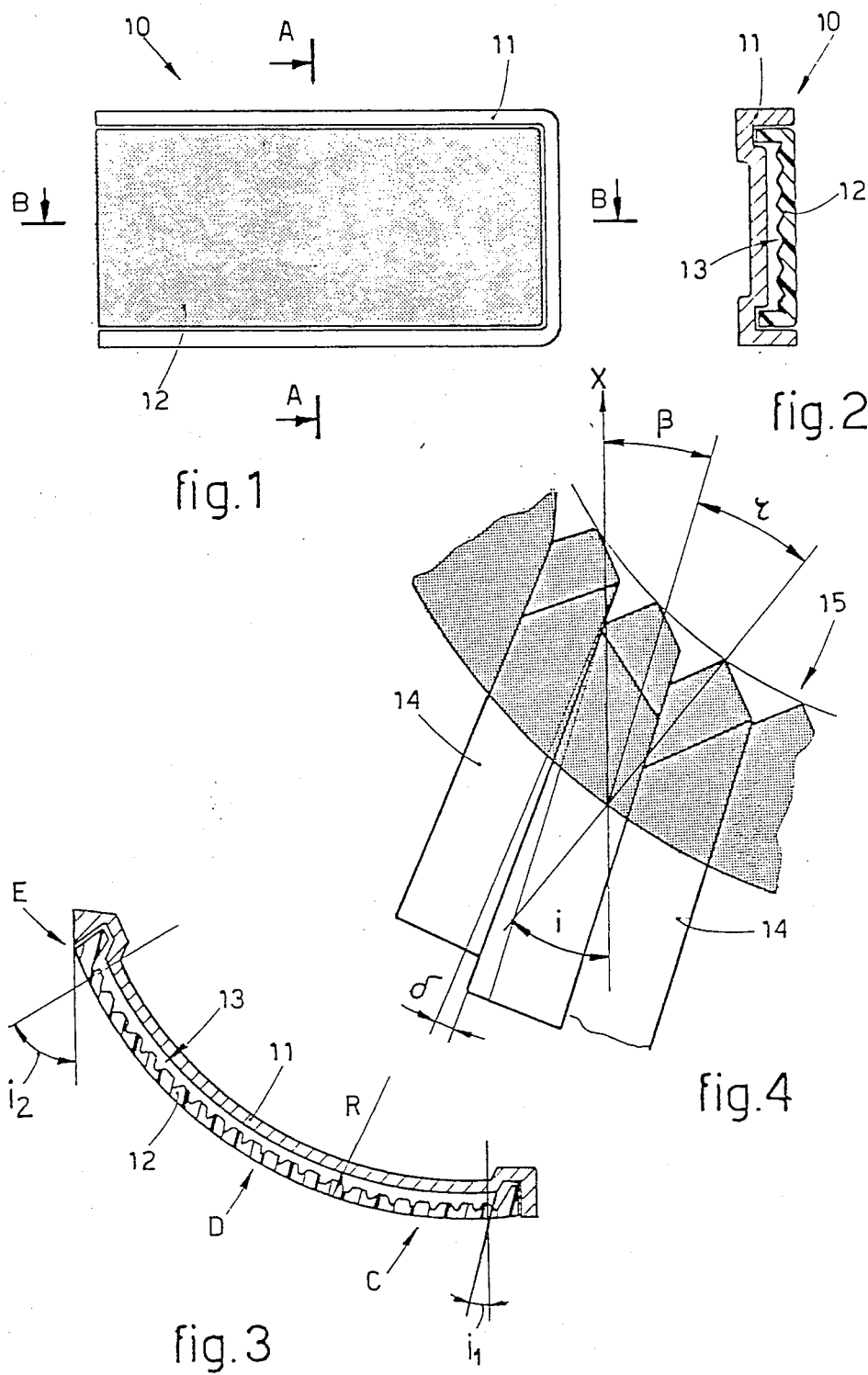

BARS FOR REFLECTORS

This application is a continuation application of U.S. application Ser. No. 686,414, filed Dec. 26, 1984, now abandoned.

This invention concerns bars to obtain impressions for forming reflector devices for vehicles, whether road vehicles or not; to be more exact, the invention concerns bars suitable for obtaining electroformed blocks to be used as a matrix in the forming of moulds which can form reflector elements, comprising a plurality of refractive trihedra, by means of moulding.

Such reflector elements are suitable for use as articles in themselves or else as integral parts of lighting or signalling devices for motor vehicles or other road vehicles.

These reflector elements can be produced on a cylindrical or truncated-cone surface, or a surface with a differentiated or double curvature.

The invention also concerns a reflector device obtained on a cylindrical or truncated-cone surface or a surface with a differentiated or double curvature, the device being effective over the whole surface occupied by the trihedra and, besides, being also aesthetically homogeneous.

As can be readily ascertained, the rear lights of motor vehicles of the most recent design have shapes which tend to be more and more integrated into, and to follow the profiles of, the bodywork.

Therefore, and for safety requirements also, the rear lights not only involve the rear zone of the vehicle but also cover a zone merging with the side of the mudguards or the side of the body.

In such conditions some functions, such as the reflector for example, can be positioned in such merging zone where there exists at least one radius of curvature which can even be very narrow.

In the past the reflectors were standard elements which were inserted into the rear lights or bodywork in such a way that their generally flat outer surface was perpendicular to the reference or measurement axis of the vehicle.

The reflectors have recently been integrated into the rear lights and/or bodywork and have followed the profile of the same and may therefore have their outer surface inclined and/or curved in relation to the reference axis.

This situation has entailed the embodiment of reflector devices with moulds which, instead of having a homogeneous continuity of refractive trihedra, are produced with blocks which are made by electroforming and tend to follow the curvature, whether single or not, of the optical assemblage.

Account being taken of their outer inclinations, such electroformed blocks are obtained with bars positioned in such a way that the backward reflection in the moulded article takes place in a direction parallel to the reference axis.

In the few reflectors fitted so far in the merging corner zones the electroformed products have been obtained either by favouring the efficiency of the rear zone and providing the side zone only with an aesthetic function or else by dividing the block into a plurality of zones related to the outer inclinations.

In the latter case, however, the union between the different blocks of the individual zones generates some lines which are very evident and often not aesthetically pleasant.

Moreover, and above all photometrically, the result is only partially good since only some trihedra of each single zone can provide a backward reflection having a direction parallel to the direction of the reference axis.

The optical principle of backward reflection in the trihedral elements enjoins that the refracted ray, after its first impact with the transparent material, meets the trihedron with a direction partially coaxial to the same.

This condition ensures that the direction of the outgoing luminous ray which has undergone backward reflection is parallel to the direction of the incident luminous ray.

The solution to such problems according to the invention consists in embodying bars which are at least partly cuneiform and in employing only a rectangular or rhomboid front section of the trihedron.

In given conditions the cuneiform bars can have a hexagonal section.

When the pack of bars is made for the subsequent electro-forming, the bars positioned alongside each other are arranged automatically fan-wise, so that each trihedron will be located in an angular position which is progressively varied according to the radius of curvature of the outer surface.

To be more specific, the angle of each cuneiform bar will be determined during the preliminary calculation by dividing the total angle of correction to be obtained on a median section by the number of bars which will be employed in the same section.

The processing required to obtain bars according to the invention, such bars having originally, for instance, a rectangular section with faces parallel to the axis of the bar, is very simple since it involves the performance of an inclined grinding pass on at least one face of the bar so as to obtain the required cuneiform shape in at least one plane.

With such bars according to the invention it is possible to obtain excellent photometric results with reflector devices of which the outer surface has very varied conformations as regards curvature or inclination.

It is necessary to bear in mind that the standards relating to the photometric values of reflector devices have been altered recently by increasing the minimum values and by reducing at the same time the surface to be considered for type approval during tests.

It is therefore advantageous to be able to employ the backward reflection of each single trihedron event if such trihedron is located on surfaces which are normally difficult to use, and this condition can be easily obtained according to the invention.

It is also evident that the union of the individual bars creates vertical lines which are distributed in an absolutely homogeneous manner over the surface, thus providing a good aesthetic appearance as well as a good functional result.

The invention overcomes also the problems encountered when it is necessary to produce a reflector device on a truncated-cone surface or a surface with a double or variable curvature.

In such a case, and in particular with truncated-cone sections, it is necessary to insert in the various horizontal sections (from the widest to the narrowest) the same number of bars.

The invention enables the same number of bars to be employed in two different sections by using bars of a reduced width in the narrower section and by varying the sections of the bars of the other rows progressively.

The invention therefore provides for bars to be obtained with two inclinations lying on two orthogonal planes and positioned at the sides of the axis.

The first order of inclination according to the horizontal plane of the bars generates the cuneiform shape needed for the angular correction in a horizontal section.

In the case of surfaces with a double curvature, the second inclination in a vertical plane generates the tapering of the bars, which enables, in the complete pack of bars, the bars to be distributed so as to spread out like a fan in a vertical plane too and in close reciprocal contact.

The invention is therefore embodied with bars for reflectors, the bars being suitable to be assembled so as to form a male element to obtain moulds, such bars being able to have a rectangular, rhomboid or hexagonal section or section of another polyhedral shape and being characterized in that they have at least one lengthwise face at least partially tapered lengthwise.

Let us now see some embodiments of the invention with the help of the attached figures, which are given as non-restrictive examples and in which:

FIGS. 1 2 and 3 show a reflector in three orthogonal views;

FIG. 4 shows the horizontal angular taper of the bars;

FIGS. 5 6 and 7 show an enlarged application of the bars according to the invention;

Figure 7:
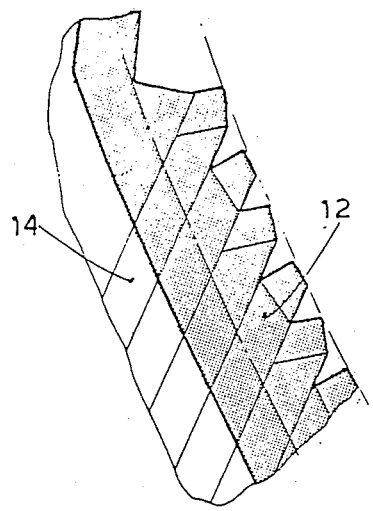

In the following description the applications and solutions cited are given as non-restrictive examples.

In FIGS. 1 and 2 a reflector 10 comprises in this example a frame 11 and reflector element 12. Such elements 11-12 are coupled together in a known manner.

The reflector element 12 has on its inner face a plurality of trihedra 13, which have been shown diagrammatically here and form the elementary refractive means.

FIG. 3 shows the reflection of luminous rays. The angle formed between a line perpendicular to the surface and the reference axis "X" corresponds to the angle of incidence "i" with which the luminous ray arrives at the surface of the reflector.

As can be seen, such angle "i" varies progressively from "i1" to "i2" in the different zones of the reflector 10.

As we said earlier, in order that the outgoing ray shall be parallel to the reference axis "X", the luminous ray which has entered the lens has to encounter a trihedron 13 in a manner parallel to the base thereof; and therefore the bar 14 which generates the trihedron 13 has to be oriented according to the angle $\beta = (i - \tau)$ (FIG. 4).

Since the angle of incidence varies progressively from "i1" to "i2", it is clear that the angle of the bars 14 too has to vary consequently from $\beta_1$ calculated for "i1" to $\beta_2$ calculated for "i2".

So that this can take place automatically, according to the invention the bars 14 have to be processed so as to take up a cuneiform shape with at least one face inclined lengthwise by an angle $\delta$ in relation to the axis of the bar 14 itself.

The angle $\delta$ is obtained by:

$$\delta = \frac{\beta_2 - \beta_1}{n}$$

where "n" is the number of the bars 14 which are located in the horizontal section under consideration (FIG. 3).

As can be seen in FIG. 4, which gives an enlarged detail of FIG. 3, the bars 14 are coupled together in such a way that they can slide against each other so as to rest on the surface of a pattern 15, which serves to make the pack of bars 14 ready to undergo the electroforming.

It is also possible to see that in this example the cuneiform shape is obtained on only one face of each bar 14, the purpose being to simplify the processing and to reduce its cost. However, such processing can be performed on more than one face of the bar 14.

Figure 6:
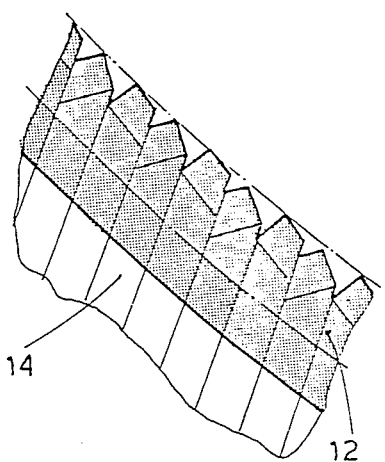
Figure 5:
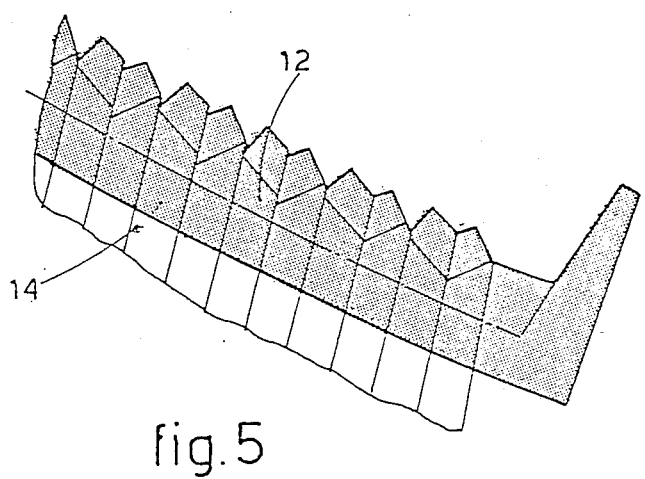

FIGS. 5, 6 and 7 show the application of the bars 14 in three portions of the pattern, which correspond to the zones C, D and E of the reflector 10 respectively.

Neighbouring bars are positioned in this example so as to face at 180° to each other. The correct arrangement of the elementary trihedra 13 in the finished reflector element 12 is obtained in this way.

But the bars 14 can also be oriented in the same direction as each other when so required by the geometry of the finished product.

The reflector element 12 produced at the end of the processing (namely after the production of the electroformed block and mould and after production of the reflector element 12 itself by the mould) comprises elementary trihedra 13 corresponding to those now comprised at the ends of the bars 14.

The reflector element 12 that will be formed by the mould, which in its turn is produced by means of an electroformed block, is shown with dotted areas in FIGS. 4, 5, 6 and 7.

Figure 8:
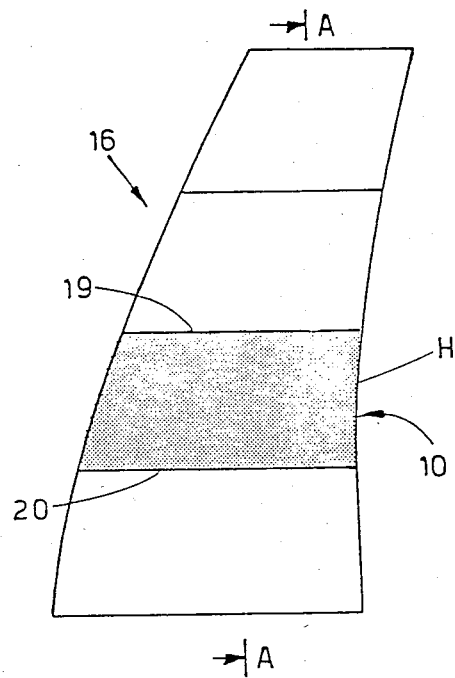
FIGS. 8 and 9 are views of an optical assemblage with a conoidal surface.
Figure 9:
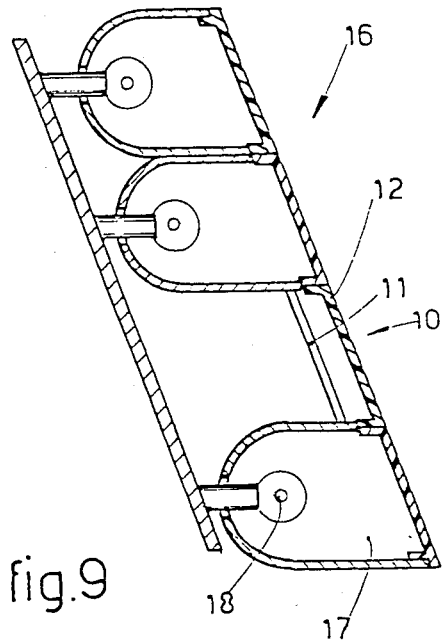

FIGS. 8 and 9 show an optical assemblage 16 having a surface shaped substantially like a truncated-cone or conoidal sector.

The considerations regarding such surface are applicable also to surfaces which can be likened to a truncated cone.

The optical assemblage 16 incorporates a reflector 10 formed according to the invention.

Chambers 17 can also be seen which lodge lamps 18 positioned for the various functions.

Figure 10:
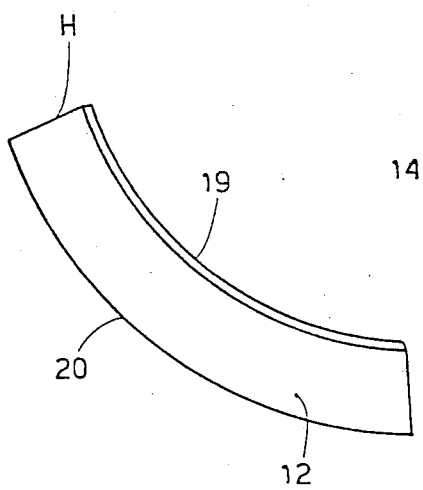
FIG. 10 is a horizontal section of FIG. 8.

FIG. 10 shows the reflector element 12 between lines 19 and 20 in FIG. 8 and makes evident the curvature of the reflector element 12 in the horizontal plane.

In view of the substantially conical shape of the optical assemblage 16, such curvature varies along the height H of the element 12.

If it is desired to obtain an aesthetic result such that the lines formed by the trihedra 13 of the lens of the optical assemblage 16 have to be positioned on the vertical generating lines of the truncated-cone surface of the lens itself, it is necessary to provide an arrangement of bars 14 which will have, in the various horizontal sections (for instance, 19 and 20 and intermediate sections), a pitch variable and growing, in this case, from above downwards, since it is necessary to maintain within each section the same number of trihedra and therefore of bars in the block or pattern.

This means that the preparation of the bars needed for the electroforming will have to take into account a gradual reduction of thickness from below upwards.

Figure 11:
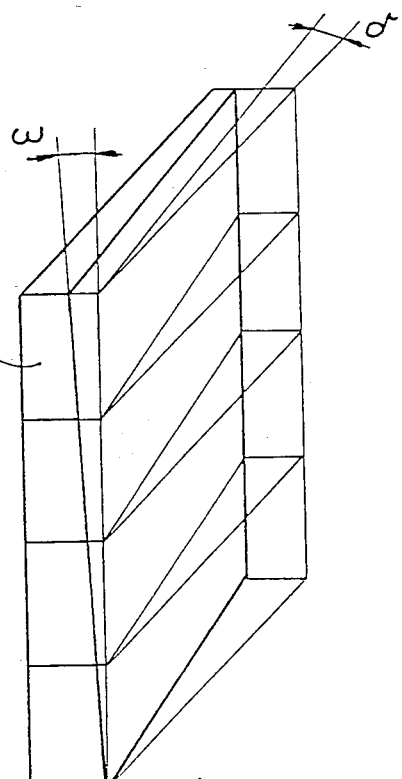
FIG. 11 shows the processing of a row of bars.

Such reduction is determined analytically and can be performed in practice by a grinding operation on a whole vertical row of bars, as is shown diagrammatically in FIG. 11.

In this case, besides setting the inclination of the surface to be ground at the angle δ required for the curvature of the outer surface, it is necessary to add a second inclination, in a plane at a right angle to the first inclination, at an angle ω of which the purpose is to reduce the thickness from S1 to S2.

In this way it is possible to obtain the diverging lines of the truncated-cone surface.

What is claimed is:

1. A matrix for making a mold which is to make a curved reflector having a radius of curvature, comprising a plurality of bars, each of said bars having a lengthwise axis, a faceted end face and a plurality of lateral faces, at least one of said lateral faces of each bar being tapered with respect to the lengthwise axis of the bar; wherein the axis of each bar varies progressively according to the radius of curvature of the curved reflector so that essentially all of the light from a single source incident from a direction which forms a reference angle with respect to the radius of curvature on the curved reflector is reflected in the same direction.

2. A curved reflector made from the mold which is formed from a matrix, said reflector having faceted surfaces wherein the faceted surfaces are identical to the faceted surfaces of the matrix bars as claimed in claim 1.

3. A matrix as claimed in claim 1, wherein at least two adjacent lateral faces of each of said bars are tapered with respect to the lengthwise axis of the bar.

4. A matrix as claimed in claim 1, wherein at least two opposed lateral faces of each of said bars are tapered with respect to the lengthwise axis of the bar.

5. A method for making a matrix which in turn can be used to make a mold for making a curved reflector having a radius of curvature, comprising:
   making a plurality of bars, each of said bars having a lengthwise axis, a faceted end face and a plurality of lateral faces;
   tapering at least one of said lateral faces of each bar with respect to the lengthwise axis of the bar; and
   coupling said plurality of bars together to form a matrix;
   wherein the axis of each bar varies progressively according to the radius of curvature of the curved reflector so that essentially all of the light from a single source incident from a direction which forms a reference angle with respect to the radius of curvature on the curved reflector is reflected in the same direction.

6. A method for making a matrix as claimed in claim 5, wherein at least two adjacent lateral faces of each of said bars are tapered with respect to the lengthwise axis of the bar.

7. A method for making a matrix as claimed in claim 5, wherein at least two opposed lateral faces of each of said bars are tapered with respect to the lengthwise axis of the bar.

* * * * *

UNITED STATES PATENT AND TRADEMARK OFFICE
CERTIFICATE OF CORRECTION

PATENT NO. : 4,733,946

DATED : March 29, 1988

INVENTOR(S) : Giuliano COSSETTI

It is certified that error appears in the above-identified patent and that said Letters Patent is hereby corrected as shown below:

Title page:

In the Assignee, replace "Seima Italiano SpA" with --Seima Italiana SpA--.

Signed and Sealed this

Sixth Day of September, 1988

Attest:

DONALD J. QUIGG

Attesting Officer

Commissioner of Patents and Trademarks